Oct. 11, 1966   C. J. L. WARREN ETAL   3,277,863
CANDY-ENROBING APPARATUS
Filed Oct. 26, 1962   3 Sheets-Sheet 2

United States Patent Office 3,277,863
Patented Oct. 11, 1966

3,277,863
CANDY-ENROBING APPARATUS
Christopher John Lewis Warren, 20 Oakdene Road, and John William Milross, 6 Tolpits Lane, both of Watford, England
Filed Oct. 26, 1962, Ser. No. 233,260
8 Claims. (Cl. 118—30)

The present invention relates to an apparatus for use in the manufacture of sweets of the kind comprising an edible center covered or enrobed with a layer of toffee.

Enrobing of edible sweet centers with a coating of toffee has usually been carried out by dipping the center to be coated into a bath of hot toffee syrup in fluid condition and due to the tacky or sticky nature of the coating material before it has set, and its setting characteristics, the dipping operation has hitherto usually been required to be carried out by hand, particularly in the case of high grade products where uniformity of thickness of enrobing layer and appearance are important considerations.

By the term hot toffee syrup is to be understood any hot viscous sugar confectionery boilings, butter scotch, fondant and like syrups.

It is an object of the present invention to provide a machine capable of enrobing sweet centers by dipping the centers in a bath of hot viscous toffee syrup to produce a coated sweet having a smooth coating layer of substantially uniform thickness and if necessary closely simulating the hitherto hand-made product.

The apparatus for producing sweets according to the invention comprises a conveyor movable between a loading station and a delivery station, a number of spaced supports connected with said conveyor for movement therewith, pins or spikes on said supports for the reception and conveyance of edible sweet centers to be coated, guide means associated with said conveyor whereby supports connected with the conveyor are moved away from the loading station to partly immerse the pins or spikes in a bath of hot viscous toffee syrup and thence upwards towards the delivery station, and stripper means associated with and movable relative to the pins or spikes when the supports are in the region of the delivery station to strip the coated product from the pins or spikes.

The conveyor may be an endless conveyor arranged for intermittent or step-by-step movement providing stationary periods during which centers to be coated can be applied on the pins at the loading station and the finished product removed at the delivery station and the immersion and removal of the pins of a support and the centers carried on said pins in and from the bath of hot toffee syrup may be completed during a single or a number of movement periods of the intermittently moved conveyor.

Means may be provided to effect rotation of the pins or spikes with the toffee-coated centers thereon about their own axes on the supports during at least some of the early stages of movement of the supports following removal of the pins and the coated centers from the hot bath of viscous toffee.

An embodiment of the invention is illustrated by way of example as applied to a machine specially suitable for the toffee-enrobing of nuts such as brazil nuts.

In the drawings FIG. 1 is a view in side elevation of a complete machine.

Figure 1:
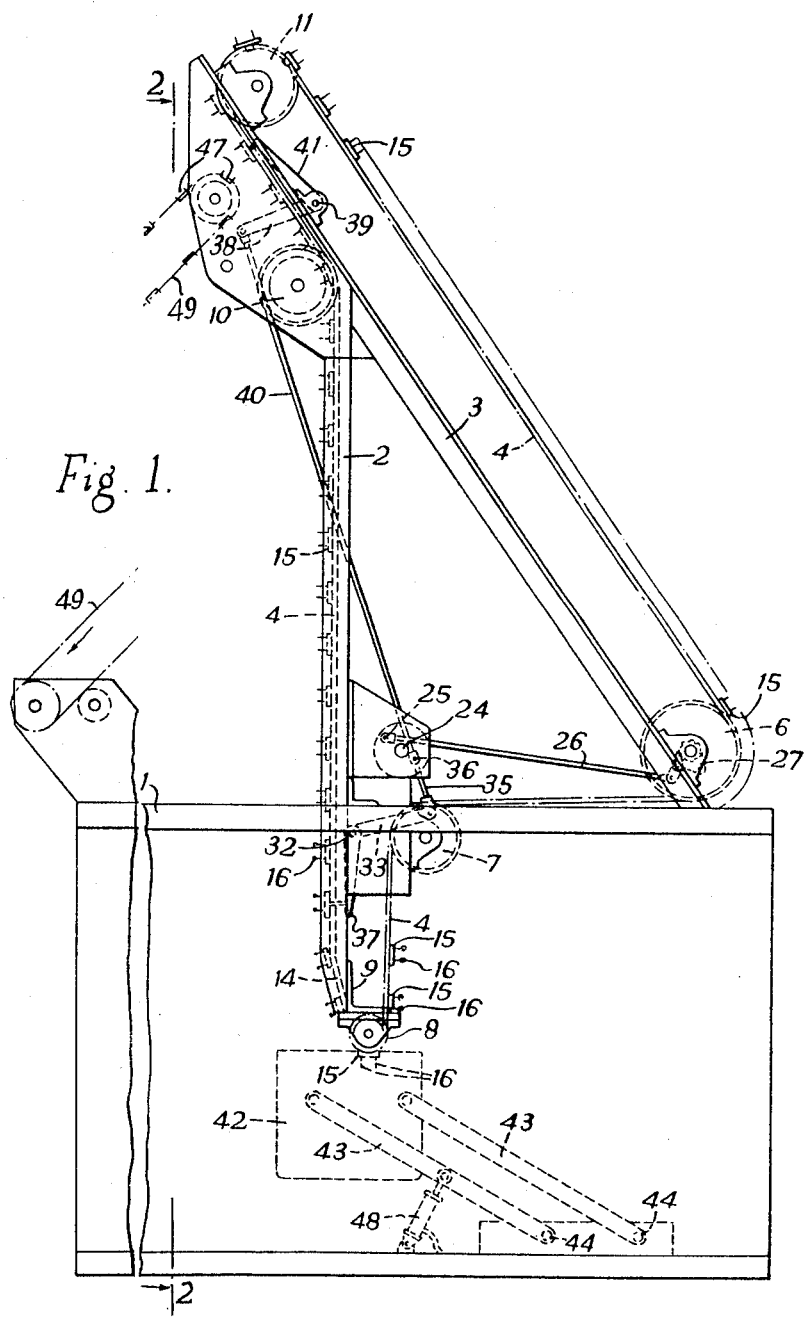

The machine shown comprises a hollow base frame structure 1 (FIGS. 1 and 2), a pair of parallel and vertical guide posts 2 fixed to the base frame structure 1 and extending from above to the interior of the base frame structure.

A further pair of guides 3 are fixedly connected between what will be termed the front end of the base frame structure 1 and the upper ends of the vertical guide posts 2, these guides 3 being of a length to extend beyond the upper ends of the vertical guide posts 2 as shown.

The vertical guide posts 2 and the guides 3 or parts fixed thereto form a supporting structure for a number of pairs of toothed sprockets forming supports and guides for a pair of parallel endless chains 4 and 5.

The pairs of toothed sprockets comprise one pair 6 located in the region of the upper front end of the base frame structure 1 at what will be termed the loading station, a second pair 7 located near the junction of the upper side of the base frame structure 1 and the vertical guide posts 2, a third pair 8 on a fixed bracket 9 at the lower end of the vertical guide posts 2, a fourth pair 10 at the upper end of the vertical guide posts 2 and a fifth pair 11 at the upper end of the inclined guides 3.

Figure 2:
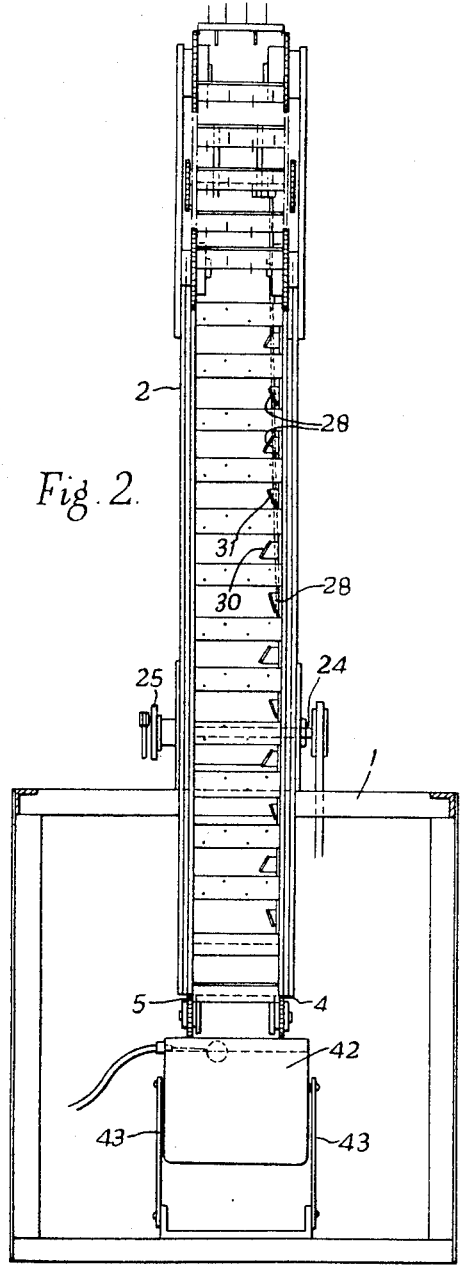
FIG. 2 is a view in sectional end elevation taken on the line 2—2 in FIG. 1.

The vertical guide posts 2 are constructed to form guide channels 12, 13 for the chains 4 and 5, these guide channels at their lower ends being directed upwards and outwards away from the axis of the sprockets at the lower end of the guide posts at an acute angle to the vertical as shown at 14 in FIG. 1, and the parts of the channels above said lower ends 14 extending substantially vertically.

Between the chains 4 and 5 and affixed thereto extend a number of parallel and uniformly spaced transverse bars 15 constituting the above-referred-to supports, each having a number, four in the case illustrated, of parallel pins 16 extending outwards at right angles to the plane of movement of the adjacent parts of the chains 4 and 5.

Figure 3:
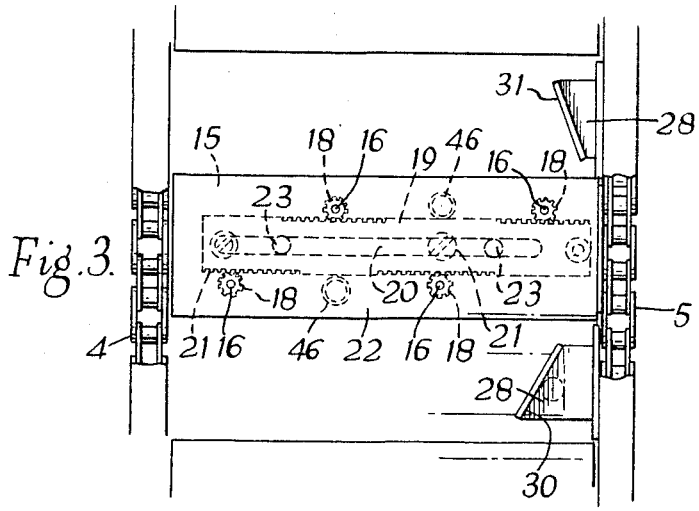
FIG. 3 is a front face view of one of the movable supports for the nuts to be enrobed.

The pins 16 are mounted in staggered relation in two parallel rows along the length of each of the support bars 15 and they are mounted for rotation about their own axes in bearings 17 (FIGS. 5 and 6) on the bars and are provided with toothed pinions 18 (FIGS. 3 and 6) fixed on their rear ends at the back of the bar 15 for co-operation with rack teeth on the two parallel edges of a slotted rack bar 19 mounted for to and fro guided movement along the back of the support bar 15 by the engagement of a slot 20 in the rack bar 19 over guide pins 21 fixed in the bar 15. The rack bars 19 are capable of longitudinal movement of an extent to impart a rotation of about 180° to the pins 16.

Figure 4:
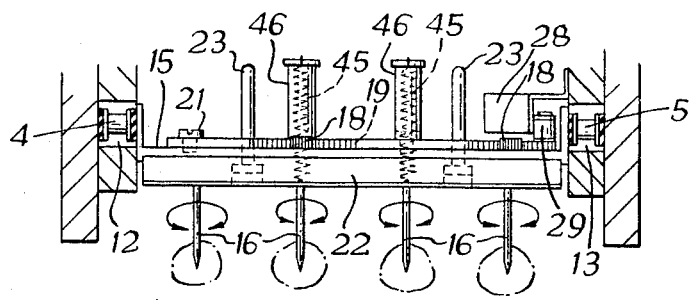
FIG. 4 is an edge view of the support of FIG. 3 and taken from above in that figure.

On one of the vertical guide posts 2 is mounted a number of vertically and uniformly spaced cams 28 for co-operation with a roller 29 projecting from the rear face at one end of each rack bar 19 (FIGS. 3 and 4) to impart longitudinal movement to the rack bars 19 on the support bars 15 as the chains 4 and 5 and the support bars move upwards in the channels 12 and 13 of the vertical guide posts 2, to effect rotation of the pins 16. The operative surfaces of alternate cams 28 extend at an inclination in opposite directions to the vertical as shown at 30 and 31 in FIGS. 2 and 3 and engage with opposite sides of the roller 29 so that each rack bar 19 is moved successively in opposite directions on its support bar to rotate the pins 16 first in one direction and then the other.

The front or outer face of each support bar 15 is covered by a flanged plate 22 pierced for sliding passage with clearance along the pins 16. To the backs of each of the flanged plates 22 are fixed a pair of spaced rods 23 slidable in guide holes in the transverse bars 15. Tension springs 45, connected between the backs of the plates 22 and the lower ends of cylinders 46 at the rear of the support bars 15, urge the flanged plates 22 towards a normal position against the front faces of the support bars 15 with the rods 23 projecting at the back of the support bars 15.

The machine is driven by a motor, not shown, imparting rotation to a shaft 24 (FIG. 1) on which is mounted an eccentric 25 connected through a rod 26 with a ratchet and pawl mechanism 27 driving the shaft of the sprockets 6 at the loading station whereby regular step-by-step movement is imparted to the chains 4 and 5, with dwells between the steps.

Figure 5:
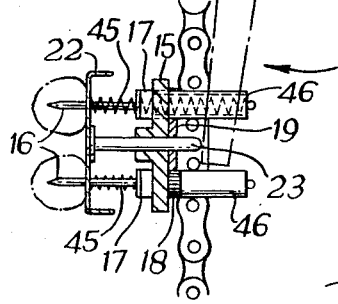
FIGS. 5 and 6 are end views illustrating means for moving coated nuts relative to the supports.

In a bearing 32 on the base frame structure 1 is mounted a bell crank lever 33 for to and fro rocking movement in a vertical plane under the control of a rod 35 connected with a further eccentric 36 on the shaft 24, and the free arm 37 of the bell crank lever 33 is arranged to make contact, during a rocking movement, with one of the rearwardly extending rods 23 connected with the flanged plate 22 of one of the support bars 15 to urge the plate 22 to a predetermined limited extent along the pins 16 and away from its support bar 15 (see FIG. 5).

A further bell crank lever 38 is mounted for to and fro rocking movement in a vertical plane in a bearing 39 on an inclined portion of one of the guides 3 above the pair of sprockets 10 at the top of the vertical guide posts 2. This bell crank lever 38 is rocked by means of a rod 40 also connected with the eccentric 36 and its free arm 41 is located to make engagement with the other rod 23 to move the flanged plate 22 along substantially the whole length of the pins 16 away from the related transverse bar 15 (see FIG. 6).

Within the interior of the base frame structure 1 and immediately below the lower end of the vertical guide posts 2 is mounted a container 42 for the butter scotch or other enrobing material said container being provided with heating means of any conventional kind (not shown) suitable to maintain the contents at the required substantially constant temperature.

To obtain the best results it is highly desirable that the surface of the viscous material in the container 42 be maintained at a constant level with reference to the lower end of the path of movement of the conveyor chains and the support bars 15.

For this purpose the container 42 is mounted for rising movement as the material therein becomes used and the level falls in the container.

As shown, the container 42 is mounted so as to form a part of an articulated parallelogram e.g. by means of parallel arms 43 pivotally connected at their upper ends with the container and at their lower ends with fixed pivots 44, as shown diagrammatically in FIG. 1, one of said arms being connected with a pneumatic or hydraulic ram 48 operating under the control of a float valve or other known form of detector (not shown) responsive to change of level of the material in the container 42, with reference to a suitable fixed point such as the axis of the chain sprockets 8 at the lower end of the vertical guide posts 2 to raise the container to maintain the required level of toffee syrup therein.

In operation, during each dwell of the conveyor chains 4, 5 one of the support bars 15 will be located at the loading station adjacent the pair of sprockets 6 with the pins 16 projecting outwards and at a small upward inclination to the horizontal so that a nut can readily be impaled upon each pin 16 by hand or by appropriate mechanical feed means.

When motion of the chains is resumed the loaded transverse bar 15 is moved downwards around the sprockets 6 and then horizontally step by step and during each dwell the pins 16 of a further support bar 15 can be loaded at the loading station.

Loaded support bars 15 move step by step approximately horizontally with the loaded pins 16 extending downwards, and then around the axis of the sprockets 7 and vertically downwards with the loaded pins extending horizontally outwards until the sprockets 8 at the lower end of the vertical guide posts 2 are reached.

As each support bar 15 moves past the underside of the lowest sprocket 8 the free ends of its pins 16 and the nuts thereon enter the bath of viscous toffee in the container 42 and the level of the toffee is such that the nuts on the pins are totally immersed and therefore receive a coating of the hot viscous liquid.

The nuts may be arranged to be swept through the toffee during a single movement of the conveyor chains or they may be arranged to remain immersed throughout one or more dwells of the chains according to circumstances and the period of immersion may be required to vary with different edible centers to be coated and different enrobing materials.

As stated above the pins 16 are in staggered position on the transverse bars. This enables the transverse spacing of the nuts to be kept small as well as the overall width between the conveyor chains. Furthermore this arrangement enables an aggregation of nuts carried upon the pins 16 of a single support bar 15 to present what is in effect a substantially continuous leading front to the surface of the bath of hot toffee syrup as the bath is entered thereby achieving an effective sweep or skim of the surface skin of partially set toffee which is almost invariably present due to the practical difficulty of accurately maintaining the well recognised desirable and quite critical temperature throughout the entire body of a mass of toffee syrup the surface of which is in contact with the atmosphere.

The partially set skin is thus swept substantially intact towards and against the heated wall of the container 42 and any tendency for broken skin to adhere to the nuts is thereby overcome so that the nuts become effectively coated with uniformly viscous toffee syrup.

With further movement of the support bars 15 the loaded pins 16 and coated nuts emerge from the bath and they are caused to move upwards first over an outwardly inclined path as represented by the inclined part 14 of the channel guides 12 and 13 in guide posts 2, so that the pins 16 are inclined downwards and the pins of one support bar 15 are offset horizontally from those of a following support bar and excess toffee dripping from nuts on the first mentioned pins falls direct into the container 42 and not onto the nuts on pins of the following upwardly moving support bar or bars in the part 14 of the channels 12 and 13.

Following upward movement over the inclined part 14 of the guided movement the support bars, pins and coated nuts are guided vertically, still step by step, and the toffee coatings set progressively.

As the setting takes place the viscosity of the toffee changes but in at least the early stages following travel in the inclined path 14 and return of surplus toffee to the container 42, the toffee still remains capable of some degree of flow such as could result in surface deformation and marked irregularity in thickness of the coating of toffee on the nuts.

In order to meet this problem the pins 16 are caused to rotate, successively in opposite directions, during a succession of the step by step movements of the support bars vertically upwards.

As each support bar 15 is moved from the inclined path 14 to the vertical path, the roller 29 on its associated rack bar 19 makes engagement with one of its sides with one of the cams 28 so that the rack bar is moved longitudinally in one direction on its support bar to rotate the pinions 18 and consequently the pins 16 and toffee-coated nuts thereon through approximately 180°. During the next succeeding movement, the roller 29 makes engagement with its other side with the next succeeding cam 28 so that the rack bar is moved in the other direction and the pinions 18, pins 16 and nuts rotated through approximately 180° in the other direction.

The number of rotations imparted to the nuts after leaving the inclined path 14 may vary according to the setting time of the toffee syrup.

During an early dwell in the vertical movement of a support bar 15, while the toffee syrup coatings are still not set, the free arm 37 of the rocking bell crank lever 33 meets one of the rods 23 at the back of the flanged plate 22 so that the plate 22 is moved against the springs 45 along the pins 16. The distance moved is such that the coated nuts are caused to take a position where they project partly from the ends of the pins 16 as shown in dotted lines in FIG. 5 without however being dislodged from the pins.

Thus toffee is wiped from the free ends of the pins 16 by the nuts so that set toffee on the pins will not subsequently interfere with stripping of the finished product from the pins and also toffee will flow and seal the hole in the outer end of the nut. Furthermore pressure of the flanged plate 22 will produce a small flattening of the toffee coating at the back of the nut simulating the flat on the back of the hand-made product.

Successive turnings of the pins 16 and the coated nuts thereon preferably take place in opposite directions as described above and in practice with the chains moving at about 7 to 8 feet per minute and with 20 to 24 dwells per minute and coating brazil nuts with butter scotch toffee, as few as three turns of the coated nuts between three successive dwells following movement in the inclined path 14 is usually found sufficient, though more turns may be imparted without disadvantage.

In the production of such butter scotch toffee coated brazil nuts it is usually found effective for the entry and emergence of nuts to and from the bath to take place during two successive movements of the chains, the nuts remaining immersed at least during the one intervening dwell.

The step by step rising movement of the support bars 15 and the coated nuts thereon continues until the support bars move into the space between the pair of sprockets 10 at the upper end of the vertical guide posts 2 and the pair of sprockets 11 at the upper end of the guides 3, the chains 4 and 5 when traversing this space moving at an outward inclination to the vertical as shown in FIG. 1 so that the pins 16 with the coated nuts thereon extend outwards and at a small downward inclination to the horizontal.

Figure 6:
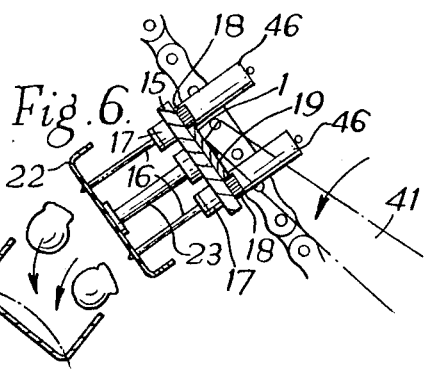

The position taken by successive support bars 15 during a dwell in the above-described space is such that as the upper bell crank lever 38 is rocked by the eccentric 36, the free arm 41 of the bell crank lever makes engagement with the other of the rods 23 projecting from the rear of the flanged plate 22 and through the related support bar 15 so that the flanged plate 22 is moved, against the springs 45, in this case over the whole length of the pins 16 so that the nuts with the now set toffee coatings are totally stripped from the pins 16 (see FIG. 6).

A further endless conveyor 49 (FIG. 1) bearing cups or like receivers 47 and moved synchronously with the chains 4, 5 may be provided to receive the coated nuts stripped from the pins 16 into the receivers 47 whereby they are transferred to a storage receptacle (not shown).

The embodiments of the invention in which an exclusive property or privilege is claimed are defined as follows:

1. An apparatus for producing sweets of the kind having an edible center covered with a layer of toffee, said apparatus comprising:
   a frame structure defining a loading station and a delivery station;
   a conveyor movable between said loading and delivery stations;
   means affording connection of a source of driving power to said conveyor;
   a number of spaced supports connected with said conveyor for movement therewith;
   spikes on said supports for the reception of edible centers and rotatably mounted with their axes extending substantially horizontally from said conveyor during at least part of the movement thereof;
   a container for hot viscous toffee syrup;
   guide means associated with said conveyor for guiding said supports and spikes approaching said container in a direction from said loading station downwards into said container, and partially immersing said spikes in a bath of viscous toffee in said container and guiding supports and spikes leaving said container substantially vertically upwards with said spikes extending substantially horizontally;
   and means for rotating said spikes about their own longitudinal axes during the movement of said spikes substantially vertically upwards.

2. An apparatus for producing sweets of the kind having an edible center covered with a layer of toffee, said apparatus comprising:
   a frame structure defining a loading station and a delivery station;
   a conveyor movable between said loading station and delivery stations;
   a number of spaced supports connected with said conveyor for movement therewith;
   spikes on said supports for the reception of edible centers and rotatably mounted with their axes extending substantially horizontally from said conveyor during at least part of the movement thereof;
   drive means imparting intermittent drive movement with intervening dwells to said conveyor, supports and spikes;
   a container for hot viscous toffee syrup;
   guide means associated with said conveyor for guiding said supports and spikes approaching said container in a direction from said loading station downwards into said container, and partially immersing said spikes in a bath of viscous toffee in said container and guiding supports and spikes leaving the container substantially vertically upwards with said spikes extending substantially horizontally;
   and means for rotating said spikes about their own longitudinal axes during the movement of said spikes substantially vertically upwards.

3. An apparatus for producing sweets of the kind having an edible center covered with a layer of toffee, said apparatus comprising:
   a frame structure defining a loading station and a delivery station;
   a conveyor movable between said loading and delivery stations;
   a number of spaced supports connected with said conveyor for movement therewith;
   spikes on said supports for the reception of edible centers and rotatably mounted with their axes extending substantially horizontally from the conveyor during at least part of the movement thereof;
   drive means imparting movement to said conveyor, supports and spikes;
   a container for hot viscous toffee syrup;
   guide means associated with said conveyor for guiding said supports and spikes approaching said container in a direction from said loading station downwards into said container, and partially immersing said spikes in a bath of viscous toffee in said container and guiding supports and spikes leaving said container substantially vertically upwards with said spikes extending substantially horizontally;
   means for rotating said spikes about their own longitudinal axes during the movement of said spikes substantially vertically upwards;
   and strippers slidable axially along said spikes to strip the toffee-coated edible centers from said spikes.

4. An apparatus as claimed in claim 1 wherein the said guide means associated with said conveyor includes parts constraining said supports and spikes, following emergence of the spikes from the bath of hot viscous toffee syrup, to move first over an upward path at a small inclination to the vertical in which the free ends of spikes on one support are transversely offset outwards in relation to the free ends of spikes on a next succeeding lower support.

5. An apparatus as claimed in claim 2 wherein the said guide means associated with said conveyor includes parts constraining said supports and spikes following emergence of said spikes from said bath of hot viscous toffee syrup, to move first over an upward path at a small inclination to the vertical and in which the free ends of spikes on one support are transversely offset outwards in relation to the free ends of spikes on a next succeeding lower support and for a duration embracing a plurality of dwells of said intermittently driven conveyor during the upward movement of said supports and spikes from said container.

6. An apparatus for producing sweets of the kind having an edible center covered with a layer of toffee, said apparatus comprising:
- a frame structure defining a loading station and a delivery station;
- a conveyor movable between said loading and delivery stations;
- means affording connection of a source of driving power to said conveyor;
- a number of spaced supports connected with said conveyor for movement therewith;
- spikes on said supports for the reception of edible centers and mounted with their axes extending substantially horizontally from the conveyor during at least part of the movement thereof;
- a container for hot viscous toffee syrup;
- guide means associated with said conveyor for guiding said supports and spikes approaching said container in the direction from said loading station downwards into said container, and partially immersing said spikes in a bath of viscous toffee in said container and guiding supports and spikes leaving said container substantially vertically upwards with the spikes extending substantially horizontally;
- strippers slidable axially along said spikes;
- first stripper operating means effecting a preliminary movement of said strippers in the stripping direction over a part only of the length of said spikes;
- and further stripper operating means effecting a subsequent movement of said strippers in the stripping direction of greater extent than said first movement.

7. An apparatus for producing sweets of the kind having an edible center covered with a layer of toffee, said apparatus comprising:
- a frame structure defining a loading station and a delivery station;
- a conveyor movable between said loading and delivery stations;
- means affording connection of a source of driving power to said conveyor;
- a number of spaced supports connected with said conveyor for movement therewith;
- spikes on said supports for the reception of edible centers and rotatably mounted with their axes extending substantially horizontally from said conveyor during at least part of the movement thereof;
- a container for hot viscous toffee syrup;
- guide means associated with the conveyor for guiding said supports and spikes approaching the container in a direction from said loading station downwards into said container, and partially immersing said spikes in a bath of viscous toffee in said container and guiding supports and spikes leaving said container substantially vertically upwards with said spikes extending substantially horizontally;
- and means imparting a succession of rotations to said spikes in opposite directions about their longitudinal axes during movement of said supports and spikes upwards from said container.

8. An apparatus for producing sweets of the kind having an edible center covered with a layer of toffee, said apparatus comprising:
- a frame structure defining a loading station and a delivery station;
- a conveyor movable between said loading and delivery stations;
- means affording connection of a source of driving power to said conveyor;
- a number of spaced supports connected with said conveyor for movement therewith;
- spikes on said supports for the reception of edible centers and rotatably mounted with their axes extending substantially horizontally from said conveyor during at least part of the movement thereof;
- a container for hot viscous toffee syrup;
- guide means associated with said conveyor for guiding said supports and spikes approaching said container in a direction from said loading station downwards into the container, and partially immersing said spikes in a bath of viscous toffee in said container and guiding supports and spikes leaving said container substantially vertically upwards with said spikes extending substantially horizontally;
- and means imparting a succession of rotations to said spikes in opposite directions and each through approximately 180° during movement of said supports and spikes upwards from said container.

References Cited by the Examiner

UNITED STATES PATENTS

| | | | |
|---|---|---|---|
| 935,975 | 10/1909 | Harton | 118—30 |
| 1,585,880 | 5/1926 | Schnell. | |
| 1,637,577 | 8/1927 | Lanzi | 118—30 X |
| 1,686,174 | 10/1928 | Rauschenberger | 118—30 |
| 1,991,118 | 2/1935 | Raiche | 118—423 X |
| 2,128,827 | 8/1938 | Killian. | |
| 2,303,290 | 11/1942 | Michael | 118—421 X |
| 2,525,164 | 10/1950 | Ackles | 118—30 |
| 2,695,590 | 11/1954 | Zuercher | 118—502 X |
| 2,785,650 | 3/1957 | Carlson | 118—30 X |

MORRIS KAPLAN, *Primary Examiner.*

CHARLES A. WILLMUTH, LEONARD W. VARNER, RICHARD D. NEVIUS, *Examiners.*

J. A. HAUG, *Assistant Examiner.*